(12) United States Patent
Shim et al.

(10) Patent No.: US 7,450,568 B2
(45) Date of Patent: Nov. 11, 2008

(54) SYSTEM AND METHOD FOR MANAGING A VOLP NETWORK

(75) Inventors: Choon B. Shim, Columbia, MD (US); Richard M. Tworek, Monrovia, MD (US)

(73) Assignee: Cisco Technology, Inc., San Jose, CA (US)

( * ) Notice: Subject to any disclaimer, the term of this patent is extended or adjusted under 35 U.S.C. 154(b) by 849 days.

(21) Appl. No.: 10/727,976

(22) Filed: Dec. 5, 2003

(65) Prior Publication Data
US 2005/0122958 A1 Jun. 9, 2005

(51) Int. Cl.
*H04L 12/66* (2006.01)
*H02J 7/00* (2006.01)

(52) U.S. Cl. .......................... 370/352; 713/340; 307/64
(58) Field of Classification Search .................. None
See application file for complete search history.

(56) References Cited

U.S. PATENT DOCUMENTS

| | | | | |
|---|---|---|---|---|
| 5,508,707 | A * | 4/1996 | LeBlanc et al. | 455/456.1 |
| 5,604,896 | A * | 2/1997 | Duxbury et al. | 703/26 |
| 5,778,003 | A * | 7/1998 | Puppa et al. | 370/241 |
| 5,937,165 | A | 8/1999 | Schwaller et al. | |
| 6,034,970 | A * | 3/2000 | Levac et al. | 370/466 |
| 6,359,976 | B1 * | 3/2002 | Kalyanpur et al. | 379/134 |
| 6,381,321 | B1 * | 4/2002 | Brown et al. | 370/259 |
| 6,560,648 | B1 | 5/2003 | Dunn et al. | |
| 6,591,382 | B1 | 7/2003 | Molley et al. | |
| 6,697,352 | B1 | 2/2004 | Ludwig et al. | |
| 6,741,569 | B1 | 5/2004 | Clark | |
| 6,751,194 | B1 * | 6/2004 | Ueno | 370/235 |
| 6,870,835 | B1 * | 3/2005 | Chen et al. | 370/354 |
| 7,032,129 | B1 * | 4/2006 | Borresen et al. | 714/13 |
| 7,142,512 | B1 * | 11/2006 | Kobayashi et al. | 370/232 |
| 7,221,650 | B1 * | 5/2007 | Cooper et al. | 370/236 |
| 2002/0105911 | A1 * | 8/2002 | Pruthi et al. | 370/241 |
| 2003/0023710 | A1 | 1/2003 | Corlett et al. | |
| 2003/0093244 | A1 | 5/2003 | Corlett et al. | |
| 2003/0161324 | A1 * | 8/2003 | Clemens et al. | 370/395.42 |
| 2003/0211839 | A1 | 11/2003 | Baum et al. | |
| 2004/0008665 | A1 * | 1/2004 | Johnson et al. | 370/352 |
| 2004/0073817 | A1 * | 4/2004 | Liu et al. | 713/300 |
| 2004/0105391 | A1 * | 6/2004 | Charcranoon | 370/252 |

(Continued)

OTHER PUBLICATIONS

Taylor, Steve and Walker, Joanie, *Intelligent IP-Layer Monitoring*, Network World Fusion, Network World Wide Area Networking Newsletter, May 13, 2002.

(Continued)

*Primary Examiner*—Hassan Kizou
*Assistant Examiner*—Joshua Smith
(74) *Attorney, Agent, or Firm*—Schwegman, Lundberg & Woessner, P.A.

(57) ABSTRACT

The invention provides a system and method for improved management of VoIP networks. In one respect, embodiments of the invention provide a dual channel interface between a control unit and an IP-PBX. In another respect, embodiments of the invention enable the integration of IP-PBX platforms from multiple vendors by utilizing a conversion agent. In yet another respect, embodiments of the invention monitor the performance of IP-PBX's, and/or their power sources, and initiates action where performance is deteriorating and/or where failures have occurred. In yet another respect, embodiments of the invention enable a robust 9-1-1 emergency capability for VoIP applications

12 Claims, 9 Drawing Sheets

U.S. PATENT DOCUMENTS

2005/0053001 A1* 3/2005 Jones et al. .................. 370/235
2005/0068898 A1* 3/2005 Xu .............................. 370/241

OTHER PUBLICATIONS

Lab Testing Summary Report, Miercom, Report 041202, Dec. 2002.

Schulzrinne, Henning, *Core VoIP and 911 issues and alternatives*, Columbia University, Aug. 2003.

Eisner, Jerry, [911]RE: 911 Digest, vol. 1, Issue 41, Message posted at http://lists.cs.columbia.edu/pipermail/911/2003-July/000119.html (Jul. 2, 2003).

* cited by examiner

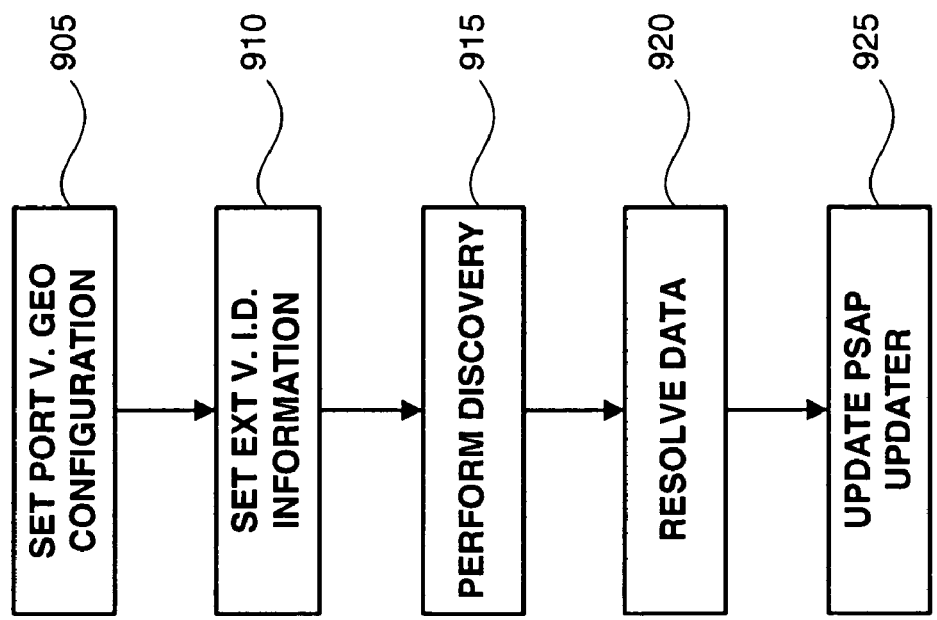

SYSTEM AND METHOD FOR MANAGING A VOLP NETWORK

BACKGROUND

The invention relates generally to the field of telecommunications. More specifically, but not by way of limitation, the invention relates to a system and method for managing a Voice over Internet Protocol (VoIP) network.

Although systems and methods are known for managing IP networks, the known systems and methods have several disadvantages with respect to VoIP traffic. For instance, in most data networks, the timing and scheduling of data packet transmissions is not critical. For VoIP applications, however, timing is of the essence to enable near real-time conversations. As a consequence, monitoring and management tools developed for data networks don't translate well to voice applications.

What is needed is a system and method for managing IP networks that provides real-time, or near-real time, performance monitoring of Internet Protocol-Private Branch exchanges (IP-PBX's) and/or other IP network components in a way that is relevant to voice communications. And because many IP networks are not highly reliable, systems and methods are needed that can mitigate the effects of hardware and/or software failures in a VoIP network.

SUMMARY OF THE INVENTION

The invention provides a system and method for improved management of VoIP networks. In one respect, embodiments of the invention provide a dual channel interface between a control unit and an IP-PBX. In another respect, embodiments of the invention enable the integration of IP-PBX platforms from multiple vendors by utilizing a conversion module. In yet another respect, embodiments of the invention monitor the performance of IP-PBX's, and/or their power sources, and initiates action where performance is deteriorating and/or where failures have occurred. In yet another respect, embodiments of the invention enable a robust 9-1-1 emergency (E-9-1-1) capability for VoIP applications.

The features and advantages of the invention will become apparent from the following drawings and detailed description.

BRIEF DESCRIPTION OF THE DRAWINGS

Embodiments of the invention are described with reference to the following drawings, wherein:

FIG. 9 is a flow diagram for an emergency communication process, according to an embodiment of the invention.

DETAILED DESCRIPTION

Figure 5:
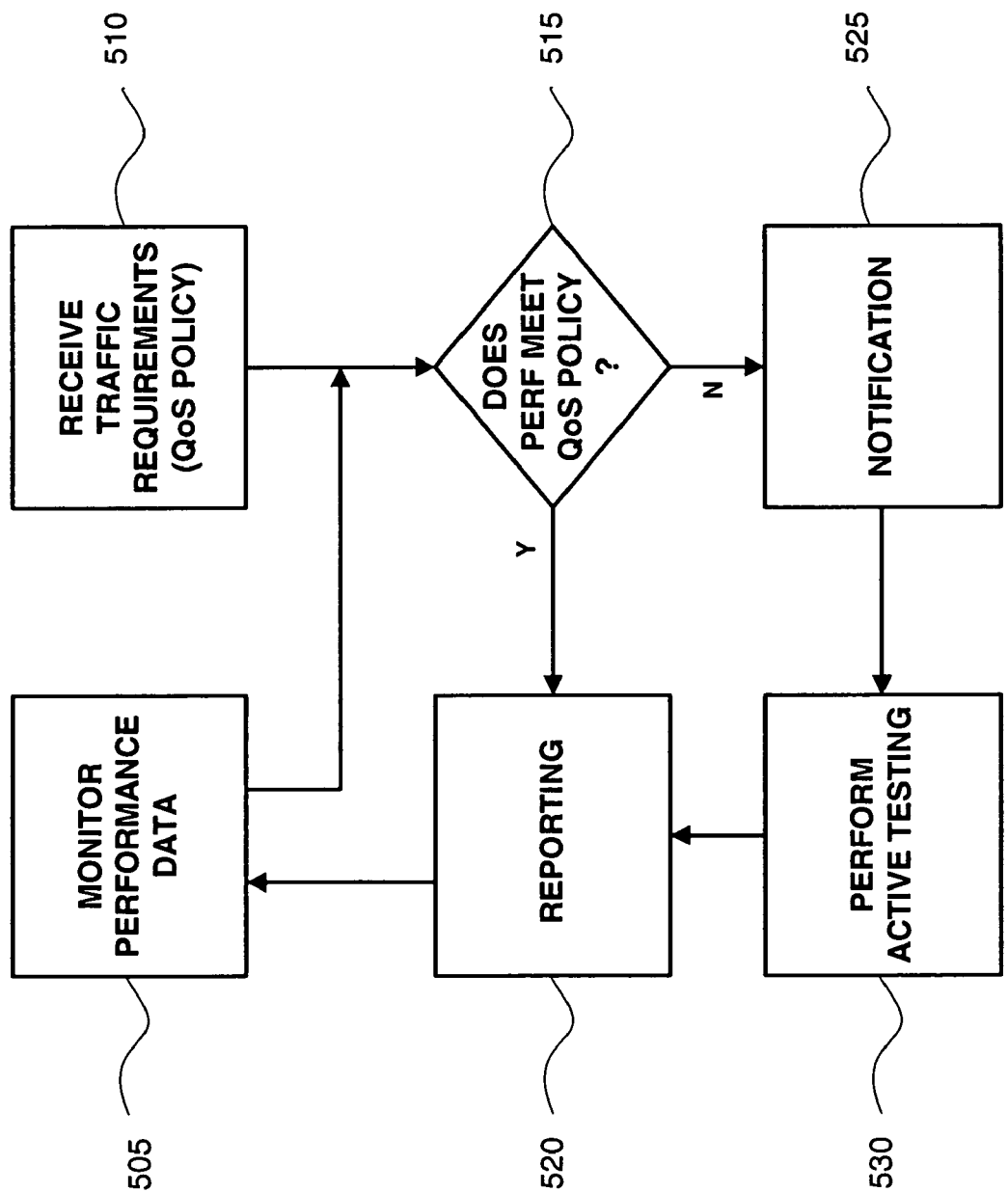
FIG. 5 is a flow diagram for a Quality of Service monitoring process, according to an embodiment of the invention.
Figure 6:
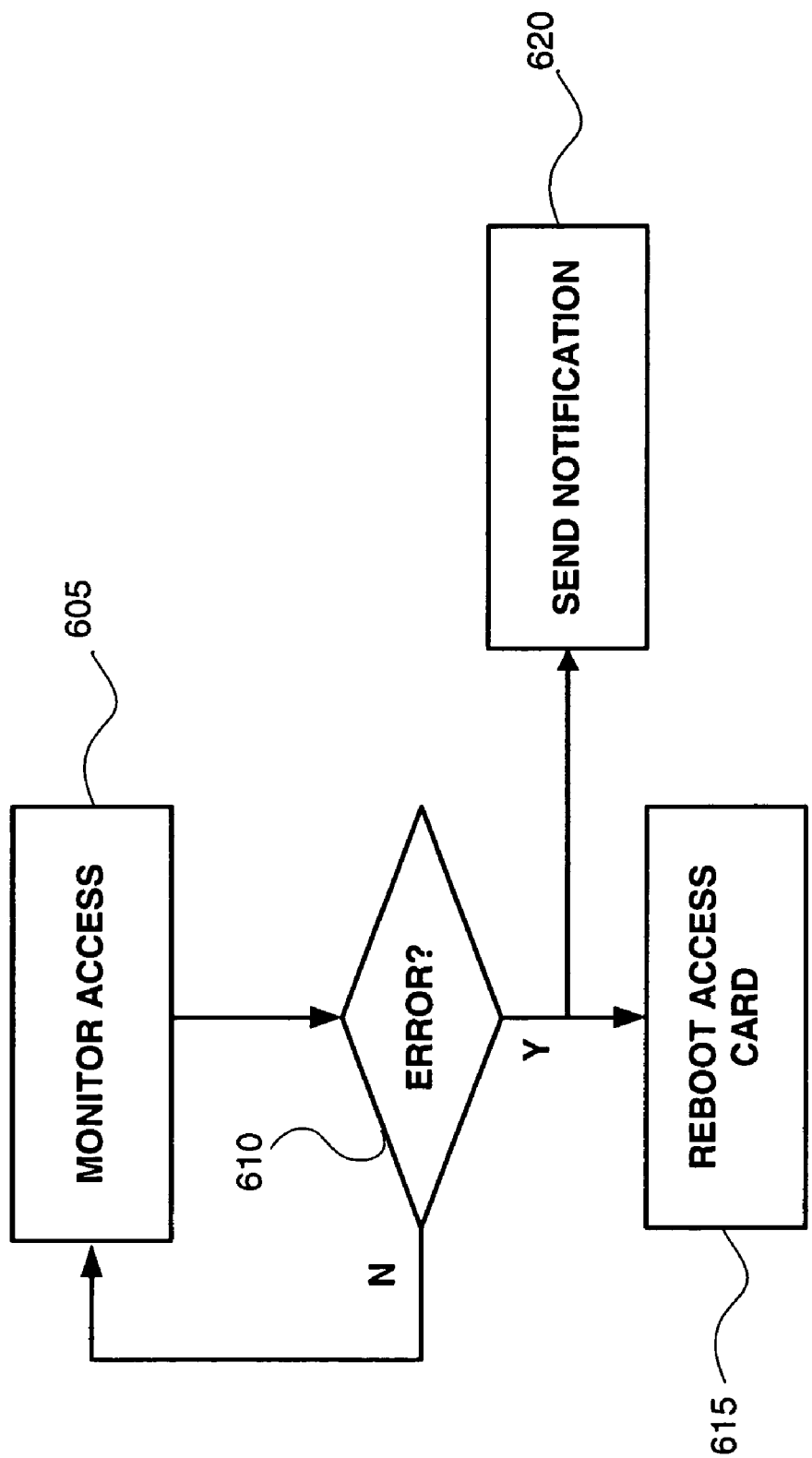
FIG. 6 is a process flow diagram for an Internet access monitoring process, according to an embodiment of the invention.
Figure 7:
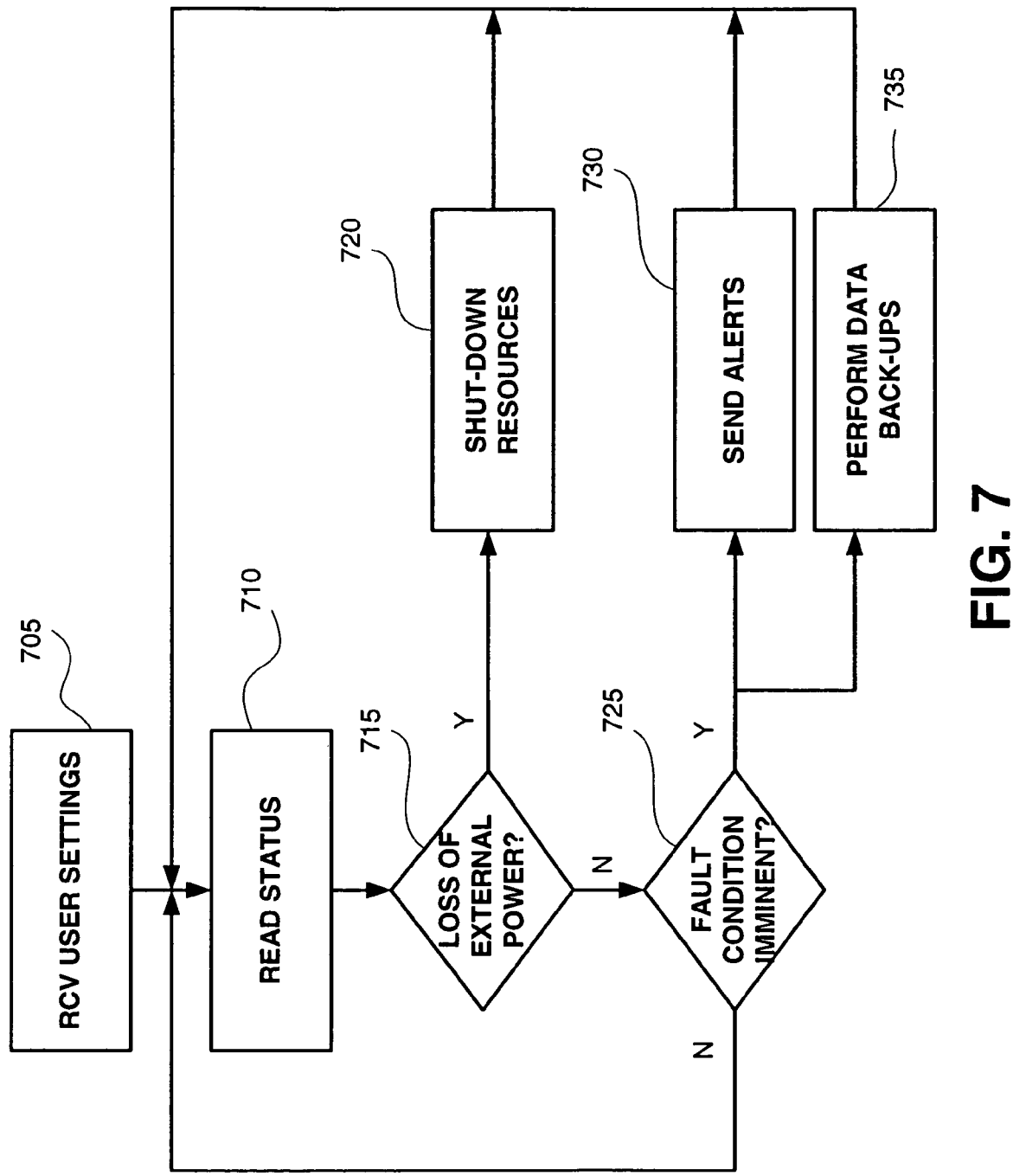
FIG. 7 is a flow diagram for a power monitoring process, according to an embodiment of the invention.
Figure 8:
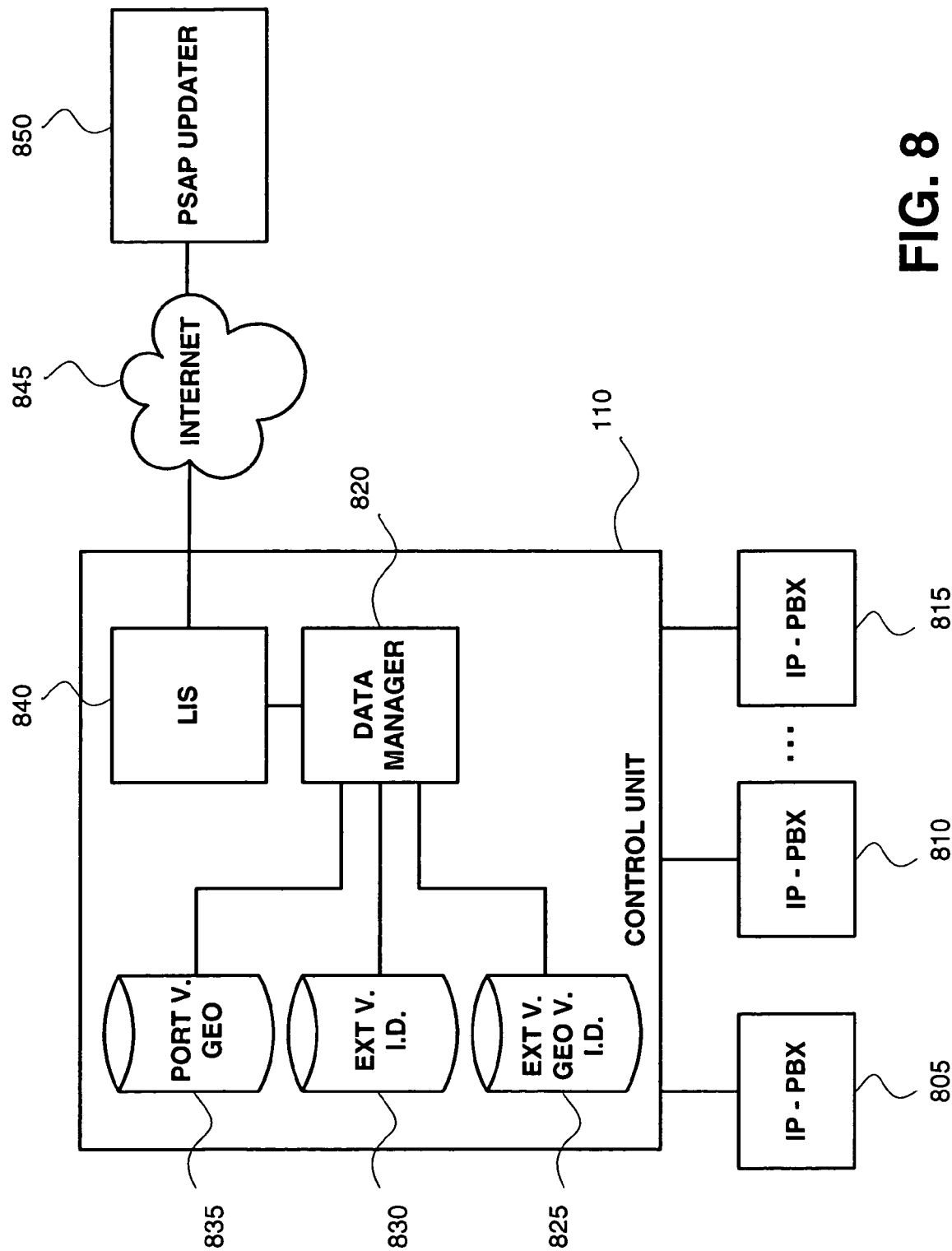
FIG. 8 is a block diagram of a functional architecture of an emergency communications system, according to an embodiment of the invention.

The invention is described with reference to a VoIP control unit. FIGS. 1-4 to illustrate interfaces between one or more control units and other network components, according to embodiments of the invention. FIGS. 5-7 depict various operations of the control unit. FIGS. 8 and 9 illustrate a functional architecture and method, respectively, for supporting a VoIP-based E-9-1-1 capability. While sub-headings are used below for organizational convenience, the disclosure of any particular feature is not necessarily limited to any particular sub-heading. We begin by introducing the control unit in a functional architecture.

Functional Architecture

Figure 1:
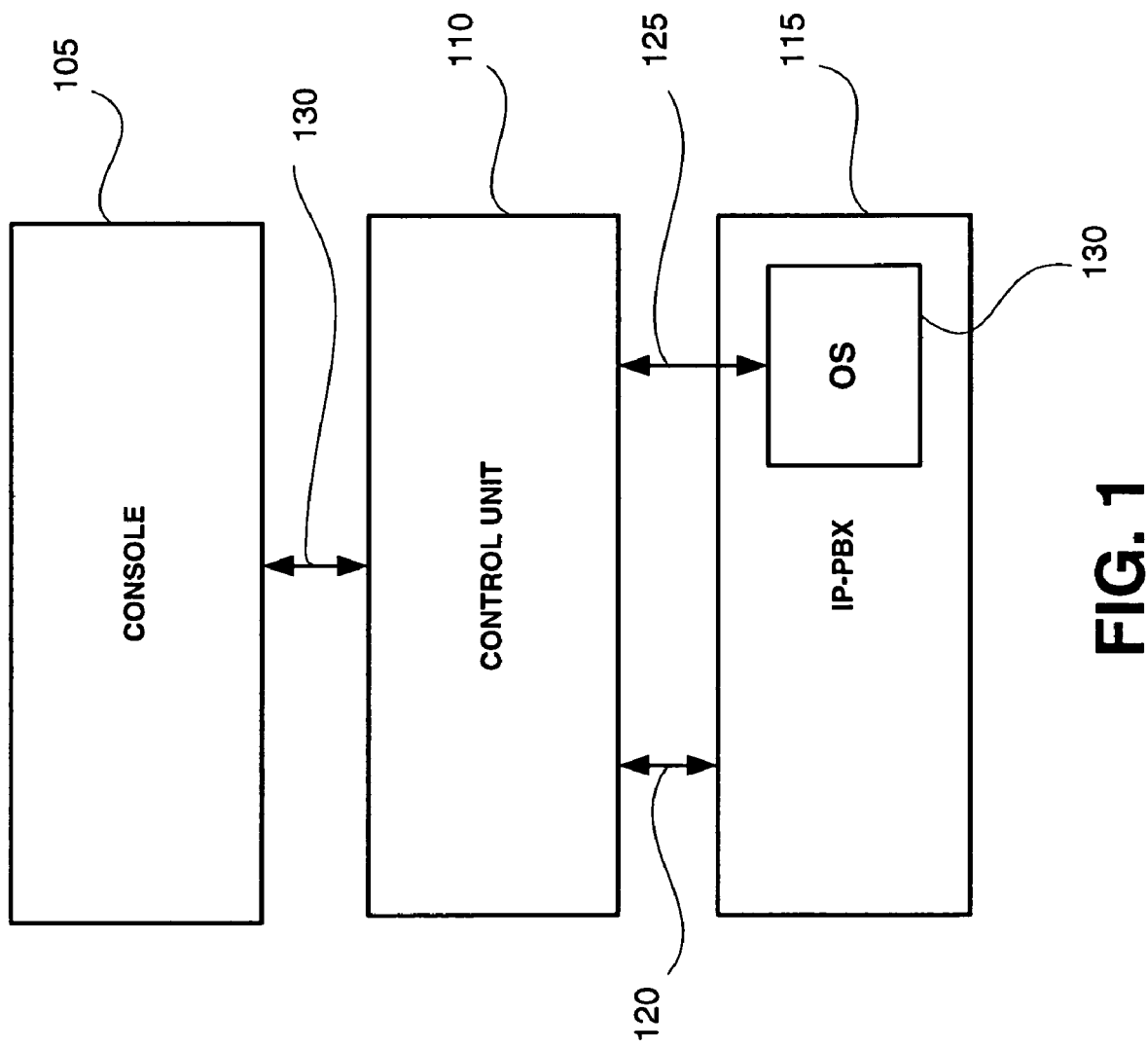
FIG. 1 is a block diagram of a communications system, according to an embodiment of the invention.

FIG. 1 is a block diagram of a communications system, according to an embodiment of the invention. As shown therein, a console 105 is coupled to a control unit 110 via a link 130. In addition, control unit 110 is coupled to an IP-PBX 115 via links 120 and 125. IP-PBX 115 includes an Operating System (OS) 130.

The control unit 110 may include a central processing unit (CPU) (not shown), such as an Intel x86 or Intel x86 compatible device. The control unit 110 may further include disk or other storage (not shown) for storing programs and/or data. In addition, control unit 110 may have Random Access Memory (RAM) (not shown) to execute Linux or other resident OS, and to execute application programs.

Links 120 and 130 may be enabled by Ethernet ports (not shown) and each of the links 120 and 130 may use, for example, TCP/IP or other suitable network protocol. On the other hand, link 125 may be enabled by a serial port on controller 110 (not shown) and may be utilizing an asynchronous communication protocol, for example.

In operation, control unit 110 may communicate with IP-PBX 115 according to instructions provided by console 105. In addition, links 120 and 125 may handle different types of communications. For example, in one embodiment, link 120 is used as a command link for executing various administrative tasks, such as backup, restore, shut down, restart, or upgrade operations. By contrast, link 125 may be used for monitoring the status of the IP-PBX 115 or other device. For example, link 125 may supply information such as performance monitoring data or other status information from IP-PBX 115 to the control unit 110. A more detailed view of the communications between the console 105, the control unit 110, and the IP-PBX 115 is presented with reference to FIG. 2.

Figure 2:
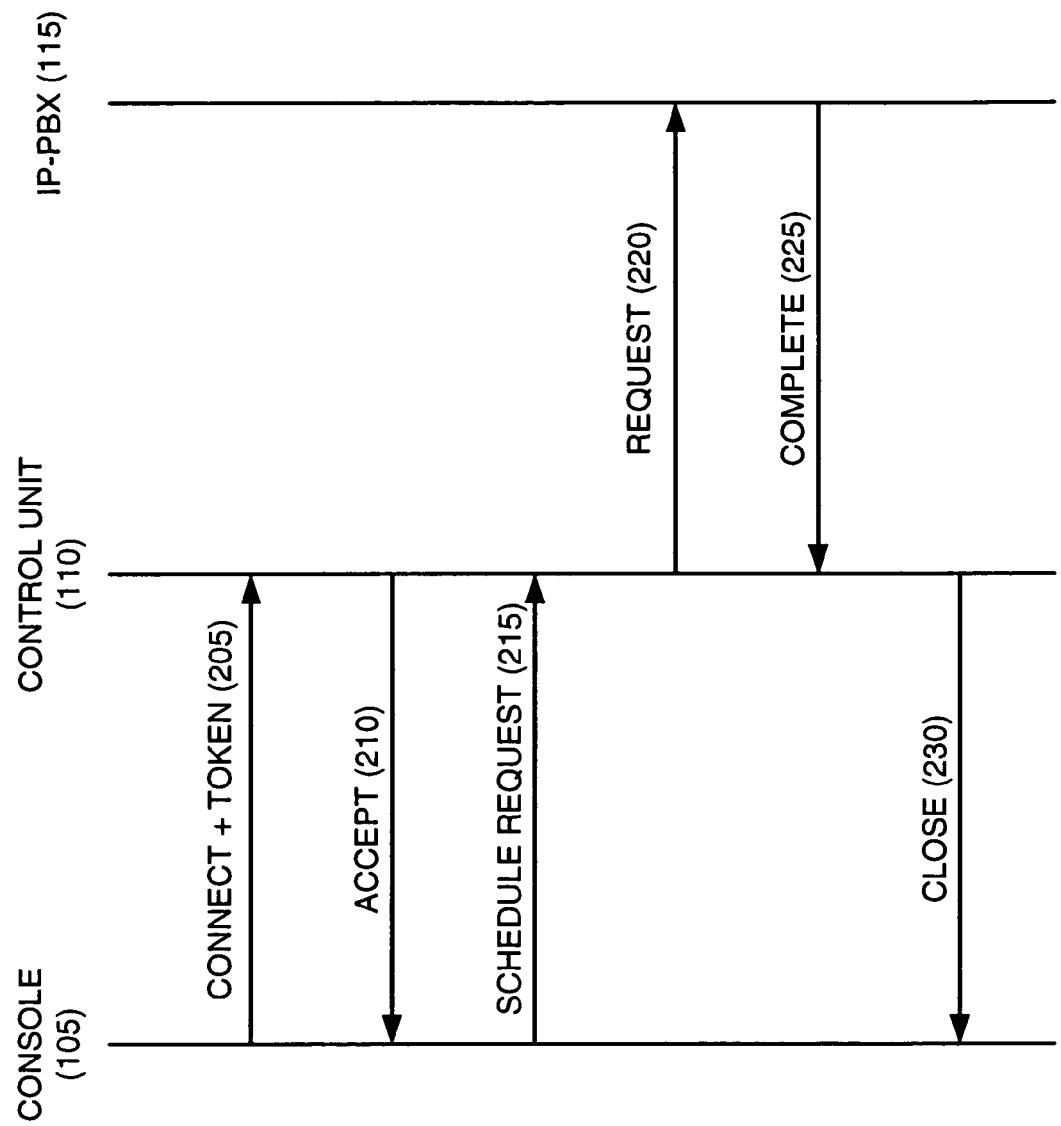
FIG. 2 is a node diagram illustrating a sequence of communications between components of a communications system, according to an embodiment of the invention.

FIG. 2 is a sequence diagram illustrating communications between components of a communications system, according to an embodiment of the invention. As shown therein, messages are illustrated between the console 105, control unit 110, and IP-PBX 115. The messages between console 125 and control unit 110 are via link 130. The messages between control unit 110 and IP-PBX 115 are via link 120, except that completion of functions may be checked via status information received in the controller 110 from the IP-PBX 115 over link 125.

For executing typical administrative tasks via link 120, the console 105 sends a connect and token message 205 to the control unit 110. In response, the control unit 110 sends an accept message 210 to the console 105. Then, the console 105 sends a schedule request message 215 to the control unit 110. Schedule request message 215 could specify, for example, that a task be performed immediately (i.e., on demand), at a specified time, or at a specified time interval from a particular time. According to the schedule of message 215, the control unit 110 sends a request message 220 to the IP-PBX 115. Upon completion of the administrative task, the IP-PBX 115 sends a complete message 225 to the control unit 110. Finally, the control unit 110 sends a close message 230 to the console 105.

Accordingly, administrative commands such as backup, restore, and shut down, for example, may be initiated by console 105, scheduled through control unit 110, and executed in the IP-PBX 115. In other embodiments, control unit 110 manages more than a single IP-PBX 115.

Figure 3:
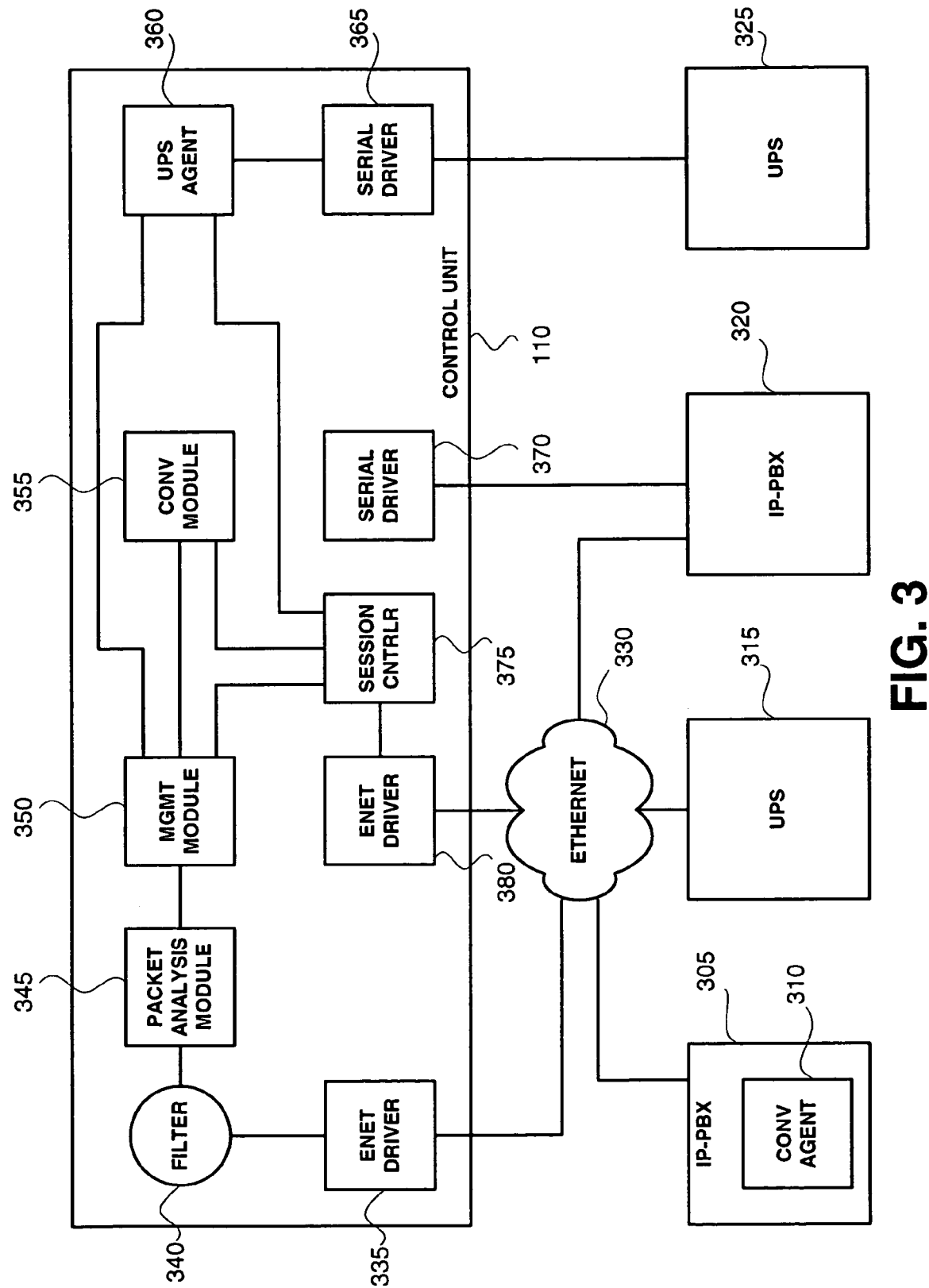
FIG. 3 is a block diagram of a functional architecture for a communications system, according to an embodiment of the invention.

FIG. 3 is a block diagram of a functional architecture for a communications system, according to an embodiment of the invention. As shown therein, a control unit 110 is coupled to each of two IP-PBX's 305 and 320, and to each of two Uninterruptible Power Supplies (UPS's) 315 and 325. IP-PBX's 305 and 320, and UPS 315 are coupled to the control unit 110, at least in part, via Ethernet 330. Coupling to the IP-PBX's 305 and 320 facilitates management of the VoIP network; coupling to the UPS's 315 and 325 facilitates management of power to network components.

As also illustrated in FIG. 3, IP-PBX 305 includes a conversion agent 310. Control unit 110 includes Ethernet driver 335, filter 340, packet analysis module 345, management module 350, conversion module 355, UPS agent 360, serial driver 365, serial driver 370, session controller 375, and Ethernet driver 380.

In operation, management module 350 may execute commands and collect data under the control of console 105.

IP-PBX 320 may be linked to control unit 110 as described above with reference to IP-PBX 115. For example, IP-PBX 320 may use Ethernet 330 as a command link, and IP-PBX 320 may send status information to the controller 110 via serial driver 370. Serial driver 370 may forward status information to the management module 350 via a data link (not shown). By contrast, IP-PBX 305 is linked to the controller 110 solely via Ethernet 330. Thus, IP-PBX 305 may use the Ethernet 330 as a command link, and for providing status information to the controller 110.

In general, IP-PBX's may be supplied by different vendors, each having a proprietary communication protocol. FIG. 3 illustrates two alternatives, which may be used in combination, for managing a multi-vendor IP-PBX environment. In a first embodiment, where it is determined that IP-PBX 320 is using a proprietary communications protocol, session controller 375 will direct communications between management module 350 and IP-PBX 320 through the conversion module 355 for transformation of communication protocol. In a second embodiment, communication protocol is transformed in the IP-PBX 305 using conversion agent 310. In this instance, the session controller 375 directs communications between the IP-PBX 305 and the management module 350 without the use of conversion module 355.

FIG. 3 also illustrates two alternative embodiments for communications with a UPS. UPS 325 is coupled to the control unit 110 via serial driver 365, where performance data for UPS 325 is processed by UPS agent 360 and forwarded to the management module 350. On the other hand, UPS 315 is coupled to the control unit 110 via Ethernet 330 and Ethernet driver 380, where the session controller 375 forwards performance data for UPS 315 to the UPS agent 360 for processing enroute to management module 350.

In addition, FIG. 3 illustrates a functional architecture for performing VoIP packet analysis. In particular, data packets may be mirrored or otherwise sampled from Ethernet 330 using Ethernet driver 335 and filter 340. Filter 340 may select packets according to type, session, origination IP address, destination IP address, or other criterion for input to packet analysis module 345. Packet analysis module 345 may determine whether the monitored packet performance (for example, loss, jitter, and/or latency) meets a predetermined Quality of Service (QoS) policy, for example.

In alternative embodiments, more, or fewer, IP-PBX's may be coupled to the control unit 110. Moreover, in alternative embodiments, no UPS's may be coupled to control unit 110. Control unit 110 may also have additional functional capabilities. For instance, the controller 110 may include drivers and/or functional modules for collecting performance data related to T1, E1, or other network access node. In embodiments of the invention, multiple control units may be coupled together, as described with reference to FIG. 4.

Figure 4:
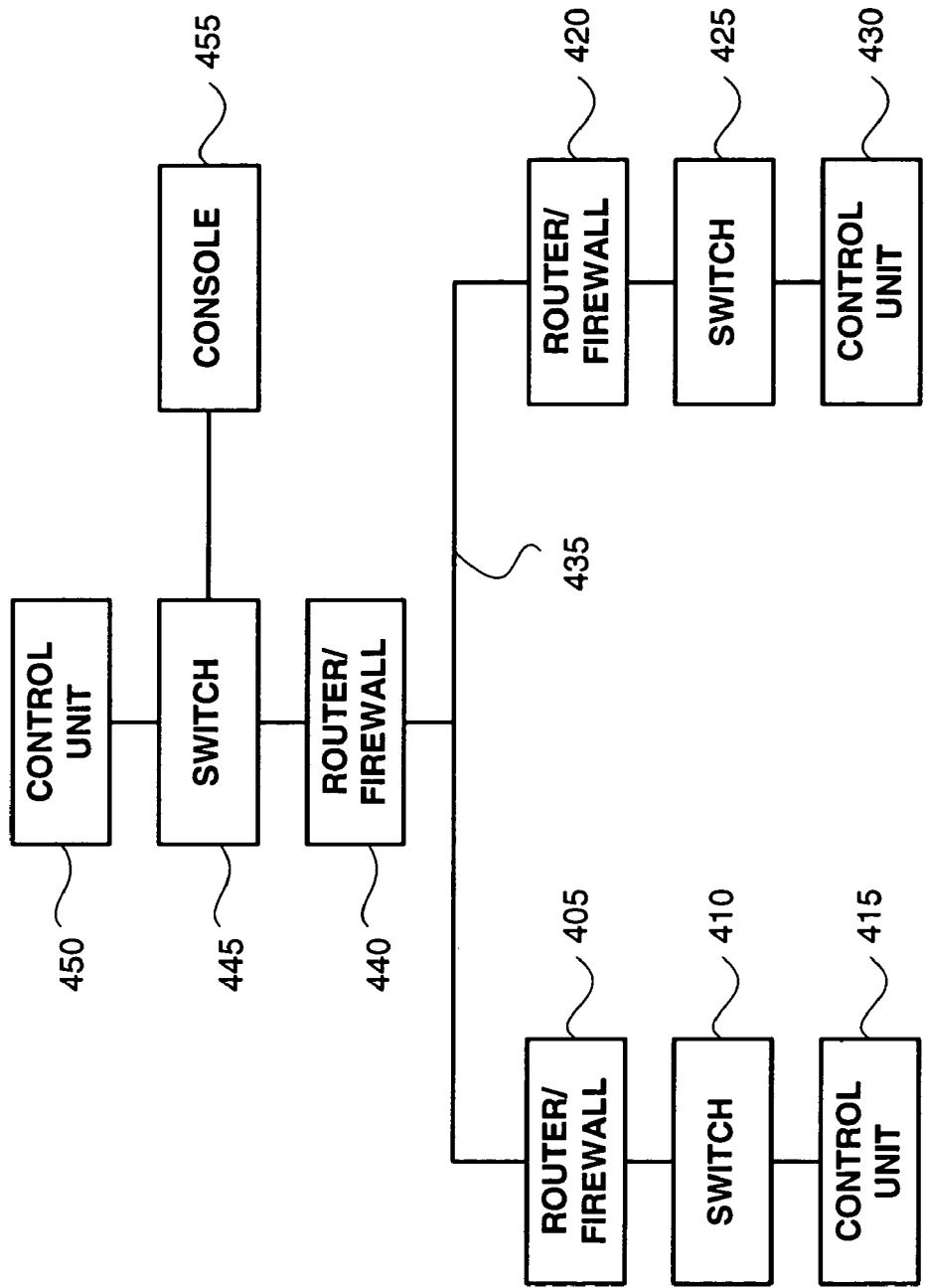
FIG. 4 is a block diagram of a functional architecture for a communications system, according to an embodiment of the invention.

FIG. 4 is a block diagram of a functional architecture for a communications system, according to an embodiment of the invention. As shown therein, control unit 415 is coupled to link 435 via a switch 410 and a router/firewall 405. Likewise, control unit 430 is coupled to link 435 via a switch 425 and a router/firewall 420, and optional control unit 450 is coupled to link 435 via a switch 445 and a router/firewall 440. Console 455 is coupled to switch 445. Link 435 may be a Local Area Network (LAN), a Wide Area Network (WAN), or the Internet, for example. Each of router/firewalls 405, 420 and 440 may be a router, a firewall, or the combination of a router and a firewall, according to application requirements.

In a stand-alone mode, a user at console 455 may communicate with control unit 415, control unit 430, and/or optional control unit 450, for example to issue commands or receive status information. In an aggregation mode, command and status communications related to control unit 415, control unit 430, and/or optional control unit 450 are aggregated at optional control unit 450. In this instance, a user at console 455 communicates with the optional control unit 450 to manage the entire network illustrated in FIG. 4.

Monitoring and Control Functions

FIGS. 5-7 depict various applications of the control units described above.

FIG. 5 is a flow diagram for a Quality of Service monitoring process, according to an embodiment of the invention. As shown therein, the process begins by monitoring performance data in step 505 and receiving traffic requirements in step 510. Monitoring step 505 may collect, for example, historical information for predetermined portions of a network, for packets originating from one or more specified start points, and/or for packets terminating at one or more specified end points. The metrics monitored by performance monitoring step 505 may include, for instance, packet loss, jitter and/or packet latency (i.e., delay). Requirements received in step 510 may specify, for example, a quality of service (QoS) policy for VoIP traffic in a portion of the network, or for traffic originating from a specified origination point. The QoS policy specified in step 510 may provide minimum standards for any one or more of loss, jitter, and/or latency.

Next, in conditional step 515, it is determined whether the monitored performance meets the QoS policy. For example, if the monitored packet loss is 1 in 100 for a particular IP origination address, but the QoS policy for that same IP origination address requires a packet loss if not greater than 1 in 10,000, then it would be determined in conditional step 515 that performance does not meet the specified QoS policy.

Where the result of conditional step 515 is positive, the process may advance to reporting step 520, then return to monitoring step 505. Where the result of conditional step 515 is negative, the process may advance to notification step 525. Notification in step 525 may be in the form of email correspondence, text message paging, or other alert. After notification step 525, the process advances to step 530 to perform active testing (e.g., network diagnostics), before continuing to reporting step 520.

In alternative embodiments, the order of notification step 525 and active testing step 530 may be switched, and results from the active testing step 530 may be included in notification step 525. In other embodiments, notification step 525, active testing step 530 and/or reporting step 520 may be omitted.

FIG. 6 is a process flow diagram for an Internet access monitoring process, according to an embodiment of the invention. In step 605 a network access point, such as a T1, E1, T3 or other node is monitored for proper operation. In conditional step 610, it is determined whether there is an error in the operation of the access node. For example, if the output of monitoring step 605 is that no signals are detected, standard T1 alarms are detected, or loop-back conditions exist, then the result of conditional step 610 may be positive.

If the result of conditional step 610 is negative, then the process returns to monitoring step 605. If however, the result of conditional step 610 is positive, then the process may advance to one or more of reboot step 615 and notification step 620. In reboot step 615, the process attempts to automatically correct the detected error, for example by rebooting an access card. In notification step 620, the process notifies a system administrator or other user via email correspondence, pager, SNMP trap, or other communication channel.

Accordingly, application code in the control unit can operate to repair errors and/or to notify a system administrator or other user of degraded network access.

FIG. 7 is a flow diagram for a power monitoring process, according to an embodiment of the invention. Power management in a VoIP network may be advantageous, for example, to preserve back-up UPS power for the most critical network resources in the event of a power utility outage. In addition, controlled shut-downs in response to a pending power outage may avoid difficult IP-PBX start-ups caused by abnormal shut-downs.

The process in FIG. 7 begins in step 705 by receiving user settings. User settings may include, for example, a number of minutes of delay that should be applied after loss of external power before one or more IP-PBX's or other resources are to be shut down by the control unit. Next, in step 710, the system monitors the power status. The system then advances to conditional step 715 to determine whether there is a loss of external power. Where the result of conditional step 715 is positive, the process advances to step 720 where the control unit shuts down one or more resources based on the predetermined delay parameter and/or other user settings. In this instance, the process would then return to monitoring step 710.

If, however, the result of conditional step 715 is negative, the process advances to conditional step 725 where it is determined whether a power fault condition is imminent. Where the outcome of conditional step 725 is positive, the process sends alerts in step 730 and/or performs data backup in step 735 before returning to monitoring step 710. If, however, the result of conditional step 725 is negative, the process returns directly to monitoring step 710.

Thus, as illustrated in FIG. 7, applications executed by the control unit can manage power in the event of actual loss of power and/or in the case where power loss is imminent.

Emergency 9-1-1

Emergency 9-1-1 (E-9-1-1) systems typically provide call back number (including extension), geographic location information (e.g., building address and floor), and caller identification information (e.g., name and organization) to local rescue dispatchers or operators via a Public Safety Awareness Point (PSAP). Because digital VoIP phones can be easily relocated on a digital network by users, new systems and methods are needed to timely maintain accurate extension, location, and caller identification information at the PSAP.

FIG. 8 is a block diagram of a functional architecture of an emergency communications system, according to an embodiment of the invention. As shown therein, the control unit 110 is coupled to IP-PBX's 805, 810 and 815. Control unit 110 is also coupled to public safety awareness point (PSAP) updater 850 via internet 845. Control unit 110 further includes data manager 820, databases 825, 830, and 835, and Location Information Service (LIS) 840. Databases 825, 830, and 835 are coupled to the data manager 820. The data manager 820 is coupled to the LIS 840.

Database 835 associates each port on IP-PBX's 805, 810 and 815 with geographic information. Data in database 835 may be relatively static. Database 830 associates telephone extensions with caller identification information. Data in database 830 may also be relatively static. Database 825 includes an association between extensions, locations, and caller identification information. Data in database 825 may be relatively dynamic, as phones are relocated between ports coupled to IP-PBX's 805, 810, and 815.

As will be described below with reference to FIG. 9, the data manager 820 is configured to automatically update database 825, and the LIS 840 is configured to automatically provide data to the PSAP updater 850. PSAP updater 850 provides updated extension, location, and caller identification information to a local PSAP (not shown) so that when an incoming 9-1-1 call is received by a local emergency dispatcher, accurate call-back extension, location, and caller identification information is available from the local PSAP (not shown).

FIG. 9 is a flow diagram for an E-9-1-1 process, according to an embodiment of the invention. In step 905, each IP-PBX port is associated with geographic location information (e.g., building address and floor, latitude and longitude, or other format, according to design choice). Step 910 may be performed, for example, as IP-PBX's are installed in a facility.

Next, in step 910, telephone extension are associated with caller identification information (e.g., name and organization, and/or other information). Step 910 may be performed, for instance, as employees join an organization.

Next, in discovery process 915, the extension or other identifier is captured for each VoIP phone that is newly coupled to an IP-PBX port. Step 915 may be executed by the data manager 820, for example by polling each port of IP-PBX's 805, 810, and 815. The polling in step 915 may be at predetermined intervals or at predetermined times.

Data is then resolved in step 920. For instance, where port 805-1 was associated with 123 maple street, $2^{nd}$ floor in step 905, where extension 555 was associated with Tom Smith in step 910, and where it is newly discovered in step 915 that extension 555 is coupled to port 805-1, then it is resolved in step 920 that extension 555 has a location of 123 maple street, $2^{nd}$ floor, and that a caller on extension 555 is Tom Smith. Step 920 may be executed by the data manager 820, for example by searching databases 830 and 835. The result of step 920 may be stored in database 825.

Finally, in step 925, newly associated data is forwarded to the PSAP updater, for example by the LIS 840. Step 925 may be performed at predetermined times, at predetermined intervals or upon updated information generated in steps 915 and 920.

Accordingly, the use of local mapping databases and the discovery process enables the control unit 110 to provide accurate call-back extension, location, and identification information to the PSAP updater 850.

CONCLUSION

The invention described above thus overcomes the disadvantages of known systems and methods by improving the performance monitoring of IP-PBX's and other IP network components in a way that is relevant to voice communications. While this invention has been described in various explanatory embodiments, other embodiments and variations can be effected by a person of ordinary skill in the art without departing from the scope of the invention.

The invention claimed is:

1. A control unit included within a VoIP network, the control unit comprising:
   a filter to select packets based upon criteria including at least one of the following criteria including type, session, origination Internet Protocol (IP) address, or destination IP address;
   a packet analysis module operatively connected to the filter to receive input from the filter, the packet analysis module to determine whether monitored packet performance meets a predetermined Quality of Service (QoS) policy;
   an Uninterruptible Power Supply (UPS) agent to receive performance data for a UPS;
   a session controller to forward the performance data for the UPS to the UPS agent;
   a management module operatively connected to the session controller, the packet analysis module and to the UPS agent, the management module to execute commands and to collect data from a console;
   a conversion module operatively connected to the session controller and the management module, the conversion module to transform a communication protocol used in communications from the management module to a IP-Private Branch Exchange (IP-PBX);
   at least one ethernet driver operatively connected to at least one of the filter, or the session controller, to receive commands from the IP-PBX; and
   at least one serial driver operatively connected to the UPS agent.

2. The control unit of claim 1, further comprising an additional IP-PBX coupled to the control unit by a link, the link including an Ethernet connection for administrative messaging.

3. The control unit of claim 1, wherein the UPS agent is coupled to the control unit by a link, the link including an asynchronous connection.

4. The control unit of claim 1, wherein the control unit further includes a serial driver operatively connected to the IP-PBX.

5. The control unit of claim 1, wherein the IP-PBX includes a conversion module, the conversion module configured to convert between a first protocol in the IP-PBX and a second protocol in the control unit.

6. The control unit of claim 1, wherein the control unit further includes:
   a first Ethernet driver coupled to the session controller; and
   a conversion module coupled to the session controller.

7. The control unit of claim 1, wherein the session controller is further configured to couple a first Ethernet driver to the management module without using the conversion module if a first protocol in the IP-PBX does match a second protocol in the management module.

8. The control unit of claim 1, wherein the control unit further includes:
   an interface to the VoIP network;
   a second Ethernet driver coupled to the interface to the VoIP network;
   an additional filter coupled to the second Ethernet driver, the additional filter configured to select packets; and
   a packet analysis module coupled to the additional filter, the packet analysis module configured to monitor performance.

9. The control unit of claim 8, wherein the additional filter is configured to select packets based on at least one of type, session, origination IP address, or destination IP address.

10. The control unit of claim 8, wherein the packet analysis module is configured to monitor at least one of packet loss, jitter or latency.

11. The control unit of claim 1, further comprising:
    a telephone coupled to the IP-PBX, the telephone coupled to the IP-PBX via one of a plurality of ports; and
    an interface to a Public Safety Awareness Point (PSAP) updater, the interface coupled to the control unit, the control unit configured to store geographic information for each of the plurality of ports, the control unit further configured to store extension and identification information related to the telephone, the control unit further configured to discover the one of the plurality of ports, the control unit configured to associate the extension, identification information, and the geographic information for the telephone.

12. The control unit of claim 11, wherein the control unit is further configured to output the associated extension, identification information, and the geographic information for the telephone to the interface to the PSAP updater.

* * * * *

UNITED STATES PATENT AND TRADEMARK OFFICE
CERTIFICATE OF CORRECTION

PATENT NO. : 7,450,568 B2  Page 1 of 1
APPLICATION NO. : 10/727976
DATED : November 11, 2008
INVENTOR(S) : Shim et al.

It is certified that error appears in the above-identified patent and that said Letters Patent is hereby corrected as shown below:

Title page, Item (54), in column 1, line 2, delete "VOLP" and insert -- VoIP --, therefor.

Title page, Item (57), under "Abstract", in column 2, line 12, after "applications" insert -- . --.

In column 1, line 2, delete "VOLP" and insert -- VoIP --, therefor.

In column 1, line 22, delete "exchanges" and insert -- eXchanges --, therefor.

Signed and Sealed this

Tenth Day of February, 2009

JOHN DOLL
*Acting Director of the United States Patent and Trademark Office*